(12) United States Patent  
Nagarajan et al.

(10) Patent No.: US 9,037,495 B2  
(45) Date of Patent: May 19, 2015

(54) ONLINE SHOPPING EXPERIENCE MODIFICATION

(75) Inventors: Srinath Nagarajan, Charlotte, NC (US); Matthew Laine Donlan, Charlotte, NC (US); Tushar N Shah, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 281 days.

(21) Appl. No.: 13/528,396

(22) Filed: Jun. 20, 2012

(65) Prior Publication Data

US 2013/0297446 A1 Nov. 7, 2013

Related U.S. Application Data

(60) Provisional application No. 61/641,579, filed on May 2, 2012, provisional application No. 61/641,700, filed on May 2, 2012.

(51) Int. Cl.
*G06Q 30/00* (2012.01)
*G06Q 30/02* (2012.01)

(52) U.S. Cl.
CPC ........ *G06Q 30/0207* (2013.01); *G06Q 30/0224* (2013.01); *G06Q 30/0215* (2013.01)

(58) Field of Classification Search
USPC ........................................... 705/26.1
See application file for complete search history.

(56) References Cited

U.S. PATENT DOCUMENTS

2011/0082735 A1* 4/2011 Kannan et al. ............. 705/14.23

* cited by examiner

*Primary Examiner* — Mila Airapetian
(74) *Attorney, Agent, or Firm* — Michael A. Springs; Moore & Van Allen PLLC; Nicholas C. Russell

(57) ABSTRACT

Embodiments of the invention are directed to a system, method, or computer program product for providing a modified online shopping experience to users. The modified online shopping experience presents offers to a user when the user is viewing a merchant online. The offers may be specifically tailored to the interests of the user viewing the merchant online. In this way, the system determines offers that the user may be interested in based on merchant data and financial institution data associated with the user. The tailored offers may be based on merchant data, such as previously accepted offers, loyalty accounts or the like and/or financial institution data such as products purchased, transaction history, and the like. The tailored offers that match the interest of a user may then be presented on the interface, website, or the like that the user is viewing when viewing a merchant online.

21 Claims, 6 Drawing Sheets

ONLINE SHOPPING EXPERIENCE MODIFICATION

CLAIM OF PRIORITY UNDER 35 U.S.C. §119

This Non-provisional patent application claims priority to U.S. Provisional Patent Application Ser. No. 61/641,579 titled "Online Shopping Experience Modification" and U.S. Provisional Patent Application Ser. No. 61/641,700 titled "Intelligent Offer Tool," filed May 2, 2012, assigned to the assignee hereof and hereby expressly incorporated by reference herein.

BACKGROUND

Today, more so than ever, individuals are choosing to shop for products online. Individuals may shop online through merchant websites, online stores, online auctions, and the like. The ability for an individual to shop for, purchase, and be shipped, within days, a product makes shopping online a popular alternative to shopping at a merchant's store. Furthermore, online shopping allows for a wider selection of products available for purchase than at a merchant location. These convenient features of online shopping make it continually more popular among consumers for purchasing any time of product, good, or service from anywhere in the world.

Offers for a product may include discounts, promotions, coupons, and/or the like. These offers may be found at a store, in a newspaper, online, on television, in an advertisement, or many other places. Typically, offer may not be the deciding factor when it comes to purchasing a product. As such, an individual may only use offers for products that he/she was already considering purchasing. In any way, the offers that an individual may use are few in comparison to the amount of offers the individual may receive. For example, an individual may receive promotions, coupons, pop-up promotions, and the like via the Internet. However, an individual shopping online may retain one or two offer codes to input into a merchant's website when the individual is purchasing a product from a merchant online. In this way, the individual will only retain one or two offers they are interested in and discard the remaining ones. There will only be a few offers that the individual will use via online shopping in comparison to the number of offers her/she may receive while on the Internet or through his/her email.

Furthermore, the offers found online, at a store, in a newspaper, on television, in an advertisement, or other places may be directed to the public as a whole. In this way, the offers show products that the merchant has and is able to sell to individuals at a discounted price. However, these offers may not reach all of the individuals interested in the offer and may, instead, reach many individuals not interested in the offers.

Therefore, a need exists for merchants to be able to tailor the online shopping experience, such as directing offers and the like, to users based on data associated with that particular individual. In this way, the individual may only receive offers when he/she is online shopping, for product that he/she may be interested in purchasing.

BRIEF SUMMARY

Embodiments of the present invention address the above needs and/or achieve other advantages by providing apparatuses (e.g., a system, computer program product and/or other devices) and methods for providing a modified online shopping experience to a user based on user merchant and/or financial accounts. In this way, the modified online shopping experience may allow for offers or alternative offers that are directed to the user's specific interest or needs. In this way, the system, utilizing a user's merchant profile is able to optimize the user's online shopping experience, such that specific offers may be directed to specific user's shopping online. Thus the user may be provided offers for products that the user may actually be interested in purchasing. These offers may be for products that the user has previously purchased, products associated with products the user previously purchased, offers for products the user is shopping for, and/or the like. In this way, the user may receive offers for products that the user has purchased in the past, may purchase in the future, or is planning to purchase. Therefore, the invention provides a user with a modified online shopping experience, such that the interface the user visualizes on his/her system is tailored to provide the user with offers for products associated with the merchant he/she is shopping that are specific to the user's interests, thus eliminating offers that are directed to individuals with no desire to purchase the product of the offer.

In some embodiments, a merchant may opt in to allow the system to provide a user with a modified online shopping experience. In some embodiments, the merchant may opt in to using the online shopping experience modification. Opting in requires the merchant to indicate that it wants to allow the system to modify a user's online shopping experience at the merchant's website, such that a user may be provided offers for products that the user may wish to purchase. Once the merchant has opted in to provide online shopping experience modification, the system may gain access to the merchant's data associated with the user and the merchant's e-commerce infrastructure. In this way, the system may utilize the merchant's online shopping interface and modify it based on a user's merchant profile. The modification may include, but is not limited to, providing offers and/or the like for products the user may be interested in. The user's interest in products may be determined by the user's merchant profile.

In some embodiments, a user utilizing online shopping via an enrolled merchant online shopping infrastructure may receive offers that are direct specifically to that user. An offer that may be provided to the user may be in the form of a discount, rebate, coupon, etc. that may expire within a predetermined amount of time or may be available to the user at any time he/she wishes to make a transaction. In some embodiments, the offers may be for products that the user previously request. In some embodiments, offers may be for specific products. In yet other embodiments, offers may be available for use at specific merchants. In some embodiments, the offers may be from several merchants. In some embodiments, the offers may be from a single merchant.

In some embodiments, the user merchant profile may include merchant data associated with a user. In some embodiments, the user merchant profile may include financial institution data associated with the user. In yet other embodiments, the user merchant profile may include both merchant data associated with a user and financial institution data associated with a user.

Merchant data is data that a merchant may access that provides an indication as to the products that a user may have interest in purchasing from that merchant. For example, if a user recently purchased a product from a merchant, such as running shoes, the merchant data may determine that this purchase was made and predict that the user may wish to buy products associated with running shoes, such as socks, shorts, etc. In another example, the merchant may determine that a user has been viewing the merchant's website. The merchant data may indicate that the user has been shopping for a particular type of product, such as watches. The merchant may then predict that the user may wish to purchase a watch. Furthermore, the merchant data may provide even more detail to even further modify the user's online shopping experience. As such, in this example, the merchant data may be able to determine the exact type, brand, model, make, style etc. of the product the user is interested in. For example, if the user is shopping for watches on the merchant's website, the merchant data may determine exactly the style, brand, etc. of the watch. In this way, the system may be able to provide a user with offers directed not only to the product of interest, but also the specific product via a modified online shopping experience. Merchant data may include, but is not limited to, purchase history, online shopping history, Internet browsing history, loyalty account information, merchant credit card information, gift card data, and the like.

Financial institution data comprises data from a financial institution that may provide an indication as to the products a user may purchase. For example, a financial institution may have access to user transaction history, user product preferences, and/or the like. User transaction history may be determined based on criteria such as, but not limited to, spending history, products acquired, amount spent on products, merchants at which products were acquired, amount spent at specific merchant, how recently products were acquired, how recently a merchant was used to make a purchase/transaction, spending/transaction patterns, such as time of date/week/month/year for making purchases/transactions, offers used to make purchases/transactions, and the like.

Merchant data and financial institution data associated with a user is combined into a user merchant profile (or user profile) and is then utilized singularly and/or in combination to determine offer matches for a user. In this way, the offers may be provide to a user via a modified online shopping experience.

The system may then match the user, based on the merchant data and financial institution data associated with a user. Matching an offer to a user based on the merchant data and financial institution data associated with the user the system to provide several offers for products provided by a merchant to a user when the user is shopping online, such that the offers may be for products that the user may actually be interested in.

In some embodiments, the system may determine when a user is accessing the Internet for online shopping. Specifically, the system will determine when the user accesses an enrolled merchant's online shopping infrastructure, such as an online store, website, etc.

Once one or more matches are determined and it is determined that the user is accessing a merchant online, the system may send one or many offers to the user. In some embodiments, the offers are presented to the user in a modified online shopping experience. The modified online shopping experience presents offers to a user when the user is searching the Internet, such as a website, interface, etc. that is associated with the merchant. In this way, in some embodiments, the offers may be overlaid onto the merchant website when the user is viewing the website. In other embodiments, the user may be directed to a completely different merchant website than a normal customer, the different merchant website may have the user's offers embedded into the website. In some embodiments, the offer may be sent to a merchant, such that the merchant may present the modified online shopping experience to the user via the merchant's website. In other embodiments, the system may, upon recognition of a user accessing the merchant's website, provide the user with the modified online shopping experience in real time directly to the user via the user system.

Embodiments of the invention relate to systems, methods, and computer program products for providing a modified online shopping experience comprising: receiving a merchant opt-in that allows access to merchant data, wherein the merchant data includes access to merchant online infrastructure and merchant customer data associated with users; determining financial institution data associated with the users, wherein the financial institution data includes transaction history information for the user; creating a user profile for each user, wherein the user profile includes both merchant data and financial institution data associated with the user; determining at least one or more products available from the merchant that the user is potentially interested in, wherein the interest in the product is based at least in part on the user profile; matching the at least one or more products available from the merchant that the user is potentially interested in with one or more offers for products available from the merchant; and providing the user the modified online shopping experience, wherein the modified online shopping experience includes the one or more offers for products available from the merchant that matches the user's interest.

In some embodiments, the invention further comprises identifying the user when the user accesses the merchant via a merchant's webpage; and providing the user with the modified online shopping experience based on the identification of the user accessing the merchant's webpage.

In some embodiments, receiving the merchant opt-in further allows for access to and manipulation of the merchant online infrastructure, such that the modified online shopping experience is presented through the merchant online infrastructure.

In some embodiments, providing the user the modified online shopping experience includes presenting the one or more offers for products available from the merchant that match the user's interest in an overlay, wherein the overlay is positioned over the merchant's website such that when the user is viewing the merchant's website the one or more offers are viewable by the user.

In some embodiments, providing the user the modified online shopping experience includes presenting the one or more offers for products available from the merchant that match the user's interest within a predefined section of the merchant's website, such that when the user is viewing the merchant's website the predefined sections of the merchant's website include the one or more offers.

In some embodiments, providing the user the modified online shopping experience includes presenting the one or more offers for products available from the merchant that match the user's interest within a second merchant website, wherein the second merchant website is a unique merchant website that is presented to the user and comprises the one or more offers embedded thereon.

In some embodiments, the user profile includes both merchant data and financial institution data associated with the user, wherein merchant data is data the merchant has compiled about the user including one or more of user loyalty accounts, transaction history, prior offer acceptance, or transaction frequency, wherein financial institution data is data a financial institution has compiled about the user including one or more of user accounts, transaction history, or income.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
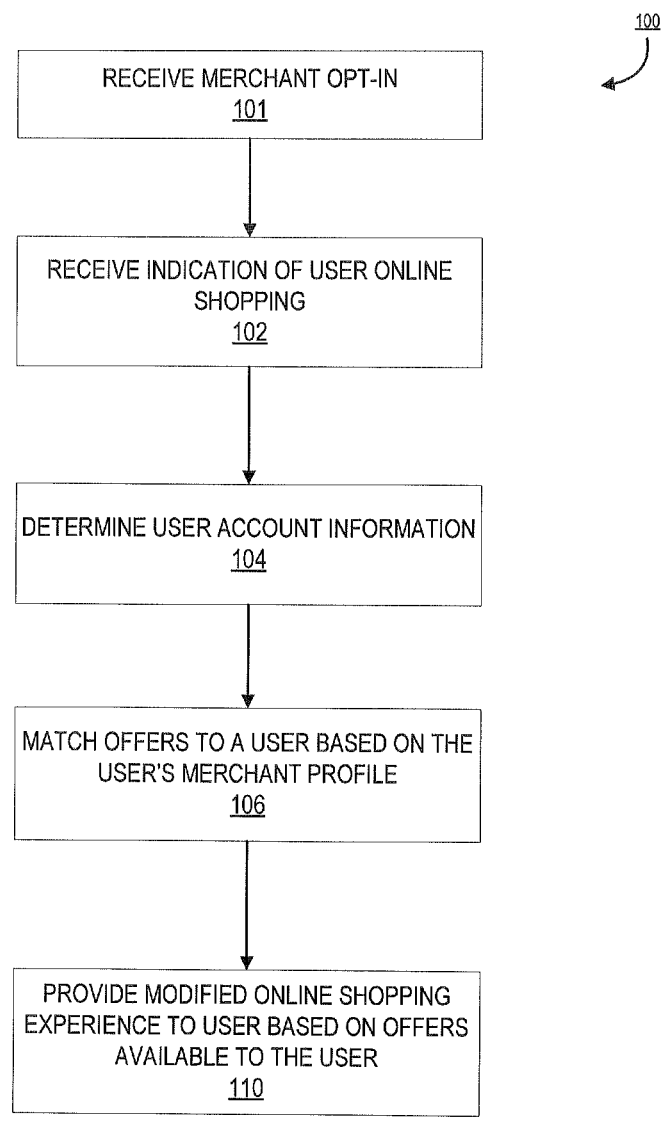
Figure 2:
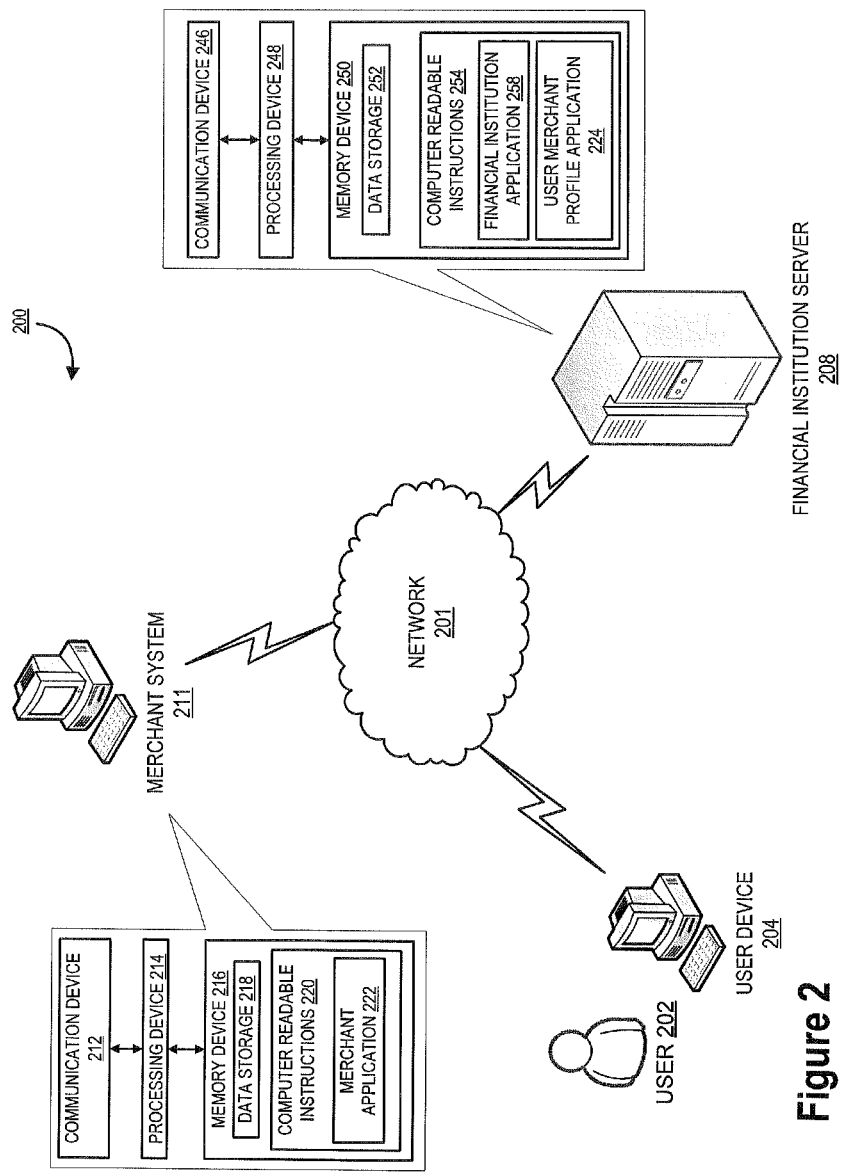
Figure 3:
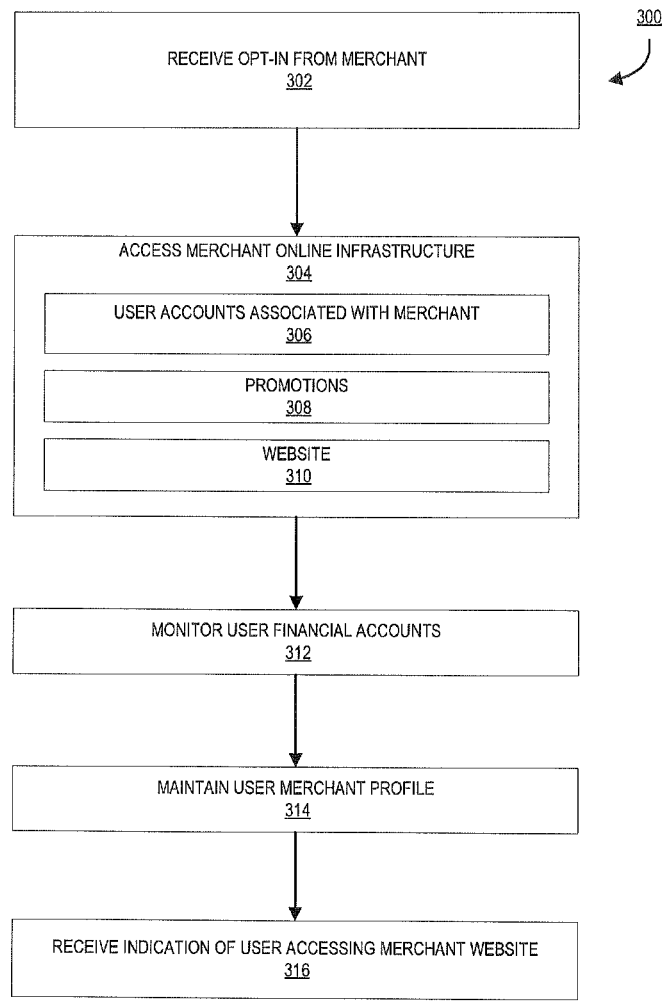
Figure 4:
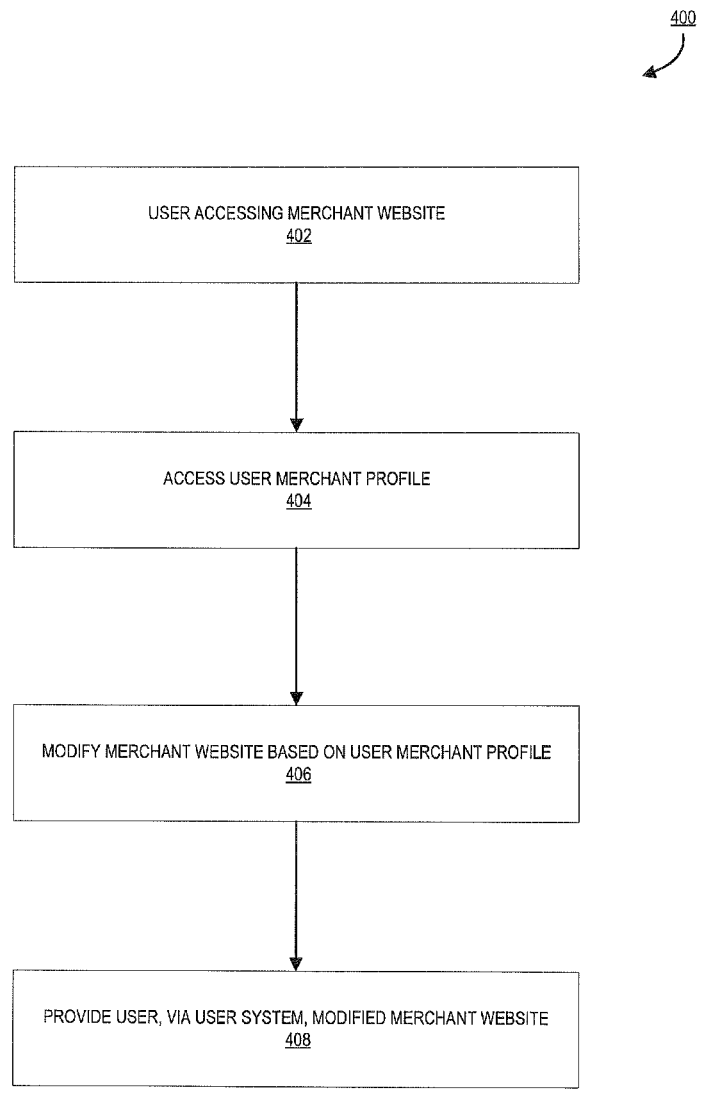
Figure 5:
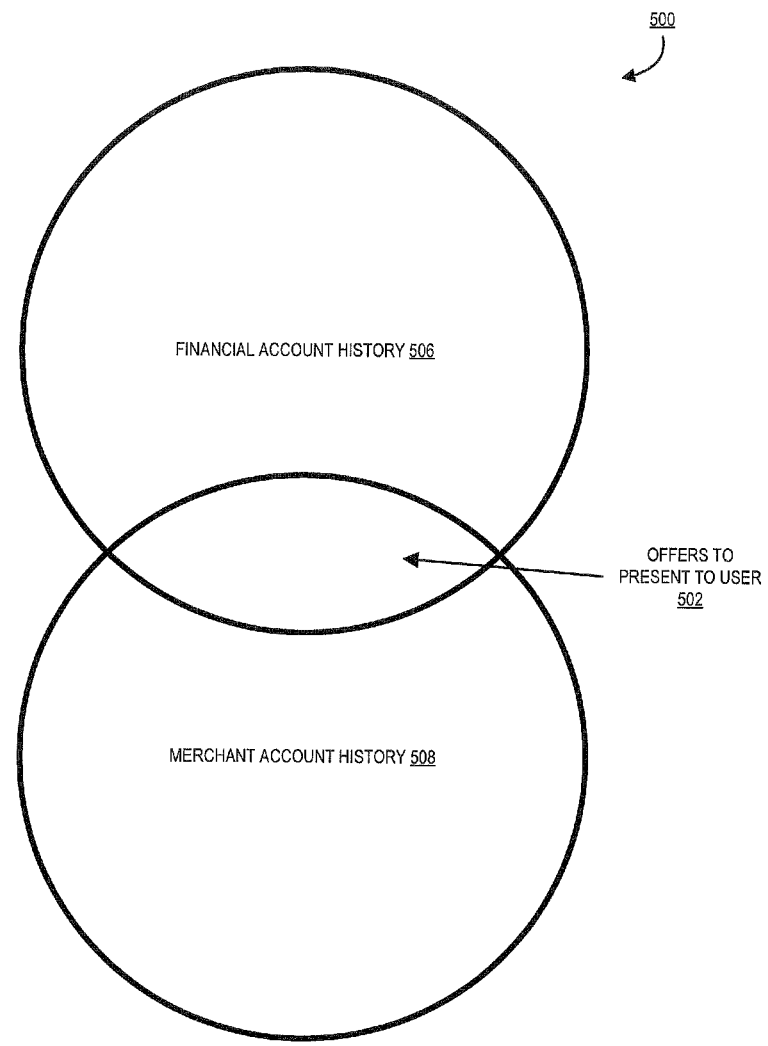
Figure 6:
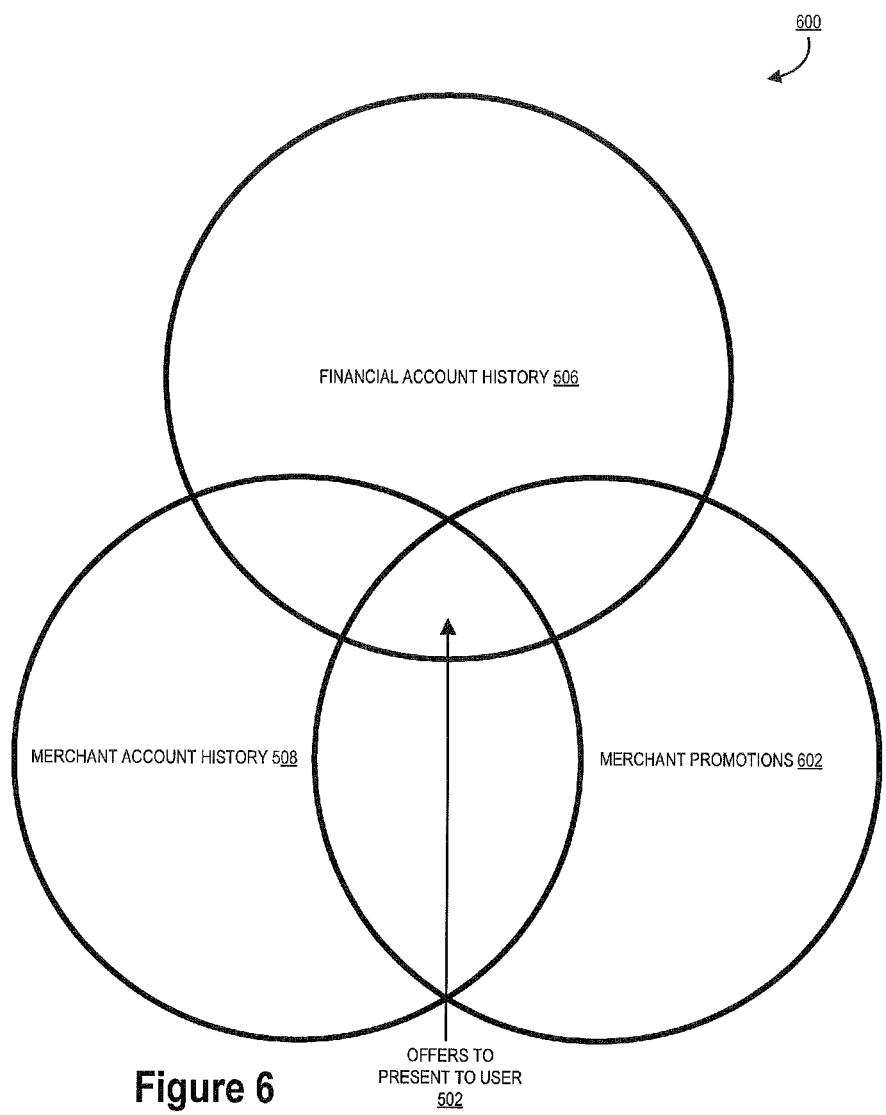

Having thus described embodiments of the invention in general terms, reference will now be made to the accompanying drawings, wherein:

FIG. 1 provides a high level process flow illustrating a modified shopping experience program process, in accordance with one embodiment of the present invention;

FIG. 2 provides a modified shopping experience program system environment, in accordance with one embodiment of the present invention;

FIG. 3 provides a process map illustrating the determination of matching offers, in accordance with one embodiment of the present invention;

FIG. 4 provides a process map illustrating user initiating the modified shopping experience program process, in accordance with one embodiment of the present invention;

FIG. 5 provides a Venn diagram illustrating the selection of offers for presentment to a user, in accordance with one embodiment of the present invention; and FIG. 6 provides a Venn diagram illustrating the selection of offers for presentment to a user, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Furthermore, as used herein, the term "product" shall mean any good, service, event, etc. that may be offered by a merchant. In addition, the term "offer" is used herein to denote any form of offer, promotion, rebate, coupon, incentive, and/or the like offered for the purchase, lease, and/or the like of a product. A "merchant" as used herein may refer to a manufacturer, retailer, online retailer, online auction service, online store, service provider, event provider, warehouse, supplier, commercial partner of a financial institution, any web based provider of a good or service, and/or the like. "Online" as used herein may refer to any use of the Internet, television, social media, electronic medium, and/or the like. "Online shopping" or "shopping online" as used herein may refer to any user use of the Internet, television, or other electronic medium or other network to search for products and/or purchase products. In this way, the user may use various Internet options, such as websites, search engines, online auctions, televisions, and the like to purchase products.

Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that offer payment account systems to users.

FIG. 1 illustrates a high level process flow for a modified shopping experience program process 100, which will be discussed in further detail throughout this specification with respect to FIGS. 2 through 6.

The first step in the process 100 is to receive an opt-in from a merchant, as illustrated in block 101. This opt-in allows the system access to the merchant's customer information data and/or the merchant's website infrastructure, such that the system may gain access to the infrastructure to manipulate and/or modify the merchant's website. The next step in the process 100 is to receive indication that a user is shopping online, as illustrated in block 102. The user could be shopping online at the merchant's website, internet auction, etc. such that a user is shopping via the Internet for products provided by the merchant. Next, as illustrated in block 104 the system may determine user account information from a user merchant profile (user merchant profile or user profile may be used interchangeable herein). The user merchant profile may include data associated with the user from merchant, such as merchant accounts and/or the financial institution, such as financial institution accounts.

The user's financial institution account data may include transaction history date based on credit, debit, and other demand deposit account purchases/transactions, user product preferences, merchant purchase history, and/or the like. The user's merchant account date may include, but is not limited to, purchase history, online shopping history, Internet browsing history, loyalty account information, merchant credit card information, gift card data, and the like. Furthermore, the user merchant profile may include information associated with previously selected offers. In some embodiments, these offers may have been selected from an offer source, such as an offer program, newspaper, online list, etc. These offers may have been previously selected, but never used. In some embodiments, the offers may have been partially used. In yet other embodiments, the offers may have been used by the user in the past.

As illustrated in block 106 the system may then match offers to a user based on the user's merchant profile. In this way, the system may determine offers for products that the user may have interest in purchasing. Next, once the system has matched offers to a user based on the user's account data, the user is provided a modified online shopping experience, as illustrated in 110. The modified online shopping experience provides a user who is online shopping offers matched to the user based on the user's account information, such that the user may receive offers for products that the user may have an interest in. As such, the modified online shopping experience presents offers associated with a user to that user when he/she is online shopping. That way, the user is presented with an interface, website, or the like that may have offers that are tailored to the user's potential interests. Because of the position of the financial institution and the merchant with respect to the user, the system is able to predict and provide offers to a user that are in close proximity to the user's interest.

FIG. 2 provides a modified shopping experience program system environment 200, in accordance with one embodiment of the present invention. As illustrated in FIG. 2, the financial institution server 208 is operatively coupled, via a network 201 to the user device 204, and to merchant systems 211. In this way, the financial institution server 208 can send information to and receive information from the user device 204 and the merchant systems 211, to match and provide the user 202 with a modified online shopping experience. FIG. 2 illustrates only one example of an embodiment of a modified shopping experience program system environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network.

In some embodiments, the user 202 is an individual. In some embodiments, the individual may be an account holder at the financial institution. In some embodiments, the individual may be an account holder at a merchant, such as a credit card or loyalty account member. The individual may be an individual that utilizes the Internet to shop and/or purchase products. The user 202 may be able to access the Internet for online shopping through the use of the user device 204.

As illustrated in FIG. 2, the financial institution server 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the user device 204 and the merchant systems 211. As such, the communication device 246 generally comprises a modem, server, or other device for communicating with other devices on the network 201.

As further illustrated in FIG. 2, the financial institution server 208 comprises computer-readable instructions 254 stored in the memory device 250, which in one embodiment includes the computer-readable instructions 254 of a financial institution application 258. In another embodiment the computer-readable instructions 254 stored in the memory device 250 includes the computer-readable instructions 254 of a user merchant profile application 224. In some embodiments, the memory device 250 includes data storage 252 for storing data related to the financial institution including but not limited to data created and/or used by the financial institution application 258, the user merchant profile application 224, or the financial information of users 202. The data storage 252 may also store data associated with the merchant online shopping infrastructure, e-commerce infrastructure, user 202 account data, and the like. In this way, the data storage 252 may store data associated with the merchant's online infrastructure, such as the merchant's website, interface, and/or the like. The data storage 252 may also store information the merchant may with respect to the user 202, such has user 202 merchant loyalty accounts, merchant credit card accounts, and the like.

In the embodiment illustrated in FIG. 2 and described throughout much of this specification, the financial institution application 258 receives merchant opt-in information, receives user account information, matches users with offers, and provides users with modified online shopping experiences. First, the financial institution application 258 allows a merchant to opt-in to the modified shopping experience program, via the merchant systems 211. In some embodiments, the merchant may opt-in by the Internet, visiting a financial institution, text messaging, voice messaging, accessing an interface, online banking, via applications, or the like. In some embodiments, the financial institution application 258 allows the merchant to communicate, via the merchant systems 211, to indicate a desire to opt-in to the program. In other embodiments, the merchant may not have to opt-in to the, but instead, may be automatically sent opt-in information. The merchants that automatically receive opt-in information may be commercial partners of the financial institution, such that the financial institution may offer services such as the modified shopping experience program to the merchant to aid the merchant in providing for customers.

The financial institution application 258, once receiving merchant opt-ins may access the merchant's e-commerce infrastructure and/or merchant data associated with the user 202. Accessing the merchant's e-commerce infrastructure allows the financial institution application 258 access to the merchant's website, interface, and the like, such that the financial institution application 258 may be able to modify the merchant's website for each individual user 202. The merchant data associated with the user 202 is data that a merchant may access that provides an indication as to the products that a user may have interest in purchasing from that merchant. Merchant data may include, but is not limited to, purchase history, online shopping history, offer acceptance history, Internet browsing history, loyalty account information, merchant credit card information, gift card data, and the like.

For example, in some embodiments the financial institution application 258 may receive offer acceptance history data for a user 202. Offer acceptance history is a history of all the offers previously accepted by the user 202. In some embodiments, these offers may have been previously accepted but not used. In some embodiments, these offers may have been previously selected and used. The offer acceptance history may include offers the user 202 may have selected from an offer source, such as an offer program, newspaper, online list, etc. These offers may have been previously selected, but never used. In some embodiments, the offers may have been partially used. In yet other embodiments, the offers may have been used by the user in the past.

The financial institution application 258 may store data regarding the previously accepted offers of the user 202 in the memory device 250, such that these offers may be compared to potential offers that may be provided to the user 202. Offer acceptance history comprises offers that the user 202 has previously used for online shopping, at the enrolled merchant, etc. In this way, offer acceptance history may comprise offers the user 202 has accepted independent of the program. For example, a merchant may provide information to the financial institution indicating that a user 202 used a coupon to purchase exercise equipment from the merchant. The coupon may have been provided to the user 202 directly from the merchant, as such, the system may receive that information via the merchant data associated with the user 202. In this way, the financial institution application 258 may provide offers to the user 202 that the financial institution application 258 may recognized as similar offers to the offers the user 202 has utilized in the past to purchase products. Therefore, there is probability that the user 202 has interest in the product or the category of that product.

The financial institution application 258 may also determine financial institution data associated with the user 202.

Financial institution data comprises data from a financial institution that may provide an indication as to the products a user may purchase. For example, a financial institution may have access to user transaction history, user product preferences, and/or the like. User transaction history may be determined based on criteria such as, but not limited to, spending history, products acquired, amount spent on products, merchants at which products were acquired, amount spent at specific merchant, how recently products were acquired, how recently a merchant was used to make a purchase/transaction, spending/transaction patterns, such as time of date/week/month/year for making purchases/transactions, offers used to make purchases/transactions, and the like.

For example, in some embodiments, the financial institution application 258 receives user 202 transaction history data from the financial institution providing the program. In some embodiments, the financial institution application 258 receives user 202 transaction history data from other financial institutions. The financial institution application 258 may receive the user 202 transaction history data, compile the data, and determine which merchants the user 202 may frequent. In this way, the financial institution application 258 may provide the frequented merchants, the merchants the user 202 spends the most money, etc., such that the offers may be matched to the user 202 based on the user's 202 transaction history. In this way, the user 202 may receive offers through the program for products, brands of products, or merchants that the user 202 has purchased or frequented.

The financial institution application 258 may then store the merchant data and financial institution data associated with the user 202 in a user merchant profile. The user merchant profile, as discussed in more detail below, is managed by the user merchant profile application 224. In this way, when an offer is needed for a modified online shopping experience, the offer may be pulled from the user merchant profile and directed to the user 202 via a modified online shopping experience.

Next, the financial institution application 258 may recognize a user 202 accessing online shopping for the merchant. The financial institution application 258, through the use of the network 201, may receive an indication that the user 202 is utilizing his/her user device 204 for online shopping. The user 202 may be utilizing the Internet to search for products from the merchant, the merchant itself, and/or the like. Specifically, the financial institution application 258 may determine when the user accesses an enrolled merchant's online shopping infrastructure, such as an online store, website, etc.

Once, it is recognized that a user 202 is online shopping at an enrolled merchant's website, the financial institution application 258 may then match the user 202, based on the user merchant profile comprising merchant data and financial institution data associated with the user 202 with offers. Matching a user 202 to offers based on the user merchant profile may provide several offers for products from the merchant to the online shopping user 202. Because the match is made between the user 202 and the user merchant profile, the offers that are matched are all offers for products that the user 202 may be interested in. Whether these offers are based on financial institution data, merchant data, and/or other means of determining user product interest, such as, but not limited to, watch lists, family and friend information, demographics, etc.

Matching offers provided by merchants with users 202 such that the offers are ones that the user 202 may be interested in, may require an analysis of the user's merchant profile, such as factors including the financial institution data and merchant data associated with the user 202. The financial institution application 258 may provide an offer to a user 202 based on one of the factors within the user merchant profile, all of these factors within the user merchant profile, or a combination of the factors. The financial institution application 258 and the user merchant profile application 224 use these factors to determine which offers from merchants are most likely to be accepted by the user 202.

Furthermore, the financial institution application 258 may comprise an artificial intelligence (AI) or other type of intelligence program provided. In this way, the financial institution application 258 may analyze the user merchant profile to make an intelligent, yet predicted offer recommendation to the user 202 via the program. A predicted offer recommendation is an offer that the financial institution application 258 determines that is going to be, or is likely going to be accepted and used by the user 202 to purchase a product via his/her online shopping.

Once one or more matches are determined and it is determined that the user 202 is accessing a merchant online, the financial institution application 258 may send one or more offers to the user 202 via a modification interface. In this way, the financial institution application 258 may present through a network 201 a modified online shopping experience to a user 202 utilizing a user device 204 for online shopping. In some embodiments, the financial institution application 258 may present a modification interface in the form of an overlay. The overlay may be presented to a user 202 overlaid on the merchant's website. In this way, the user 202 may be able to visualize offers that are directed to him/her without disrupting or changing the entire merchant website layout. Instead, the financial institution application 258 may be able to access the merchant's online infrastructure and overlay a specific modification interface for the user 202. Then the merchant's website with the overlay may be presented to the user 202 via his/her user device 204 through a network 201. In other embodiments, the financial institution application 258 may access the merchant's online infrastructure and direct a user 202 to a different merchant website than a normal customer, the different merchant website may have the user's offers embedded into the website. In some embodiments, the financial institution application 258 may direct the offer to the merchant system 211, such that the merchant may present the modified online shopping experience to the user 202 via the merchant's website. In other embodiments, the financial institution application 258 may, upon recognition of a user 202 accessing the merchant's website, provide the user 202 with the modified online shopping experience in real time directly to the user 202 via the user device 204. In some embodiments, the offers may be presented as a widget on the merchant's website. In some embodiments, the offers may be presented in a predefined area of the merchant's website.

As such, the user 202 using the user device 204 may be able to select offers directed to him/her for use when online shopping. In this way, the user 202 may not be inundated with offers for products that the user 202 is not interested in. Instead, through matching via the user's merchant profile, the user 202 only visualizes offers that are directed to him/her via a modified shopping experience.

In the embodiment illustrated in FIG. 2 and described throughout much of this specification, the user merchant profile application 224 may receive data from the merchant systems 211 and maintain the user merchant profiles. In some embodiments, the user merchant profiles may be maintained in real-time or close to real-time. Data received from the merchant may include, but is not limited to, purchase history, online shopping history, Internet browsing history, loyalty account information, merchant credit card information, gift card data, and the like. As well as offers for any products or services manufactured, sold, produced, or the like by the merchant that may be for the public, customer specific, or the merchant may wish to provide exclusively to this program. For example, the merchant may manufacture electronic equipment. The merchant may manufacture several models of speakers, CD players, DVD players, televisions, etc. The merchant may select which of these models to provide an offer to a user 202, through the program. Furthermore, the merchant may determine the type of offer to provide to the user 202. For example, the merchant may offer a percentage off the price of a product, coupons, by-one-get-one free offers, promotions, etc. The merchant may provide several different offers for one product, several products, or all products the merchant manufactures or sells. In some embodiments, the offers available may have a direct correlation to the rewards points, purchasing habits, etc. of a user 202 at the merchant. In some embodiments, the offers available may be contingent on the number of users 202 the offer is sent to. For example, if the offer is extremely beneficial or a large value, the merchant may not want to provide a lot of users 202 with the offer. The merchant may want to limit the number of offers given to users 202 or limit the value of some offers compared to others. For example, the merchant may want to reward users 202 that frequent the merchant, therefore the merchant may elect to provide greater discounts to those users 202 whom have frequented the merchant or are members of the merchant's rewards program, etc. In another example, a merchant may want to attract new customers; therefore the merchant may elect to provide greater discounts to those users 202 whom have not frequented the merchant.

In some embodiments the user merchant profile application 224 maintain the user merchant profiles. The user merchant profiles comprise financial institution data and merchant data associated with a user 202. In this way, all data associated with a user 202 that may be utilized by the modified shopping experience program may be stored in a user 202 centric platform within the user merchant profile application 224. In this way, the user merchant profile application 224 may constantly keep a user 202 centric platform of information related to offers that a user 202 may be interested in. This way, when the financial institution application 258 recognizes a user 202 online shopping at an enrolled merchant website, the user merchant profile application 224 may be able to provide the financial institution application 258 with offers within near real-time, such that the financial institution application 258 may present the offers to the user 202 in the modified online shopping experience. In some embodiments, the offers may be presented as an overlay onto the merchant's website. In some embodiments, the offers may be presented as a widget on the merchant's website. In some embodiments, the offers may be presented in a predefined area of the merchant's website. In yet other embodiment, the merchant's website may be unique to the user 202 based on the offers.

FIG. 2 also illustrates a merchant system 211. The merchant system 211 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the financial institution server 208 and the user device 204. As such, the communication device 212 generally comprises a modem, server, or other device for communicating with other devices on the network 201.

As further illustrated in FIG. 2, the merchant system 211 comprises computer-readable instructions 220 stored in the memory device 216, which in one embodiment includes the computer-readable instructions 220 of a merchant application 222. In this way, the merchant is able to communicate merchant data associated with a user 202 to the financial institution server 208 and the financial institution server 208 is able to access the merchant's online infrastructure for positioning modifications on the merchant's website. In some embodiments, the memory device 216 includes data storage 218 for storing data related to the merchant system 211 including but not limited to data created and/or used by the merchant application 222.

The merchant application 222, in some embodiments, communicated merchant data associated with a user 202 to the financial institution server 208. Merchant data such as, but not limited to, purchase history, online shopping history, Internet browsing history, loyalty account information, prior offer acceptance, merchant credit card information, gift card data, and the like may be stored within the memory device 216 of the merchant system 211. In this way, the merchant application 222 may share this data, via the network 201, to the financial institution server 208. Furthermore, the merchant application 222 may provide the financial institution server 208 with offers that the merchant is currently accepting. In this way, the financial institution server 208 may receive updated offers that the merchant may be providing to its customers in order to match the user 202 with offers from that merchant. These offers may include all offers that merchants may wish to provide to users 202 of the program.

In some embodiments, the merchant application 222 may also provide offer acceptance history of a user 202. The merchant may have data regarding the purchases of users 202 when the users 202 purchased products at the merchant, such as which purchase the user 202 made with an offer. The offer the user 202 has previously used at the merchant may or may not be an offer provided to the user 202 via the optimized offer program. In this way, the merchant application 222 may provide the financial institution server 208 user 202 offer acceptance history for that merchant.

The user device 204 is operatively coupled to the financial institution server 208 and/or the merchant system 211 through the network 201. The user device 204 has systems with devices the same or similar to the devices described for the financial institution server 208 and/or the merchant system 211 (i.e., communication device, processing device, and memory device). Therefore, the user device 204 may communicate with the financial institution server 208 and/or the merchant system 211 in the same or similar way as previously described with respect to each system. The user device 204, in some embodiments, is comprised of systems and devices that allow the user 202 of the user device 204 to access the Internet for online shopping. In this way, the financial institution application 258 may be able to access the website and provide an overlay, widget, modified section, or completely different website.

A "user device" 204 may be any mobile communication device, such as a cellular telecommunications device (i.e., a cell phone or mobile phone), personal digital assistant (PDA), a mobile Internet accessing device, or other user device including, but not limited to PDAs, pagers, mobile televisions, gaming devices, laptop computers, cameras, video recorders, audio/video player, radio, GPS devices, any combination of the aforementioned, or the like. Although only a single user device 204 is depicted in FIG. 2, the modified shopping experience program system environment 200 may contain numerous user devices 204.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 3 illustrates a flow chart of the process of determining matching offers 300, in accordance with one embodiment of the present invention. The flow chart illustrates the flow of data throughout the system. As illustrated in block 302, a merchant opt-in to the program is received. Opting in requires a merchant to indicate that it wants to allow for users 202 to access a modified online shopping experience when the user 202 accesses the merchant's website. Opting in further allows the system access to the merchant's online infrastructure, such as the merchant's website, etc. and data the merchant has comprised for users 202.

As illustrated in block 304, once the merchant has opted-in to the program, the system may access the merchant's online infrastructure 304 which allows the system to access user accounts associated with the merchant 306, merchant current offers and/or promotions 308, and/or the merchant's website 310. User accounts associated with the merchant 306 includes user purchase history, user online shopping history, user offer acceptance history, user Internet browsing history, user loyalty account information, user merchant credit card information, user gift card data, and the like. Merchant current promotions 308 include all offers that are currently being offered by the merchant. In some embodiments, the merchant current promotions 308 may be offers that are provided to the public, limited by geographic area, limited by individual, limited by number of offers presented, time frame of offer presented, etc. At block 310, the system is allowed access to the merchant's website. As such, the system may access the merchant's website, interface, and the like. In this way, the system may be able to gain access to the merchant's website such that the system may be able to modify the merchant's website for each individual user 202. The modification may be an overlay, widget, direction to a different website, etc. to provide a user 202 with a modified online shopping experience with offers presented to the user 202 during his/her online shopping that are tailored to the user's interest.

As illustrated in block 312 of FIG. 3 once the system receives data from the merchant, the system may monitor financial data, specifically financial accounts associated with the users 202. Financial institution data comprises data from a financial institution that may provide an indication as to the products a user 202 may purchase. For example, a financial institution may have access to user transaction history, user product preferences, and/or the like. User transaction history may be determined based on criteria such as, but not limited to, spending history, products acquired, amount spent on products, merchants at which products were acquired, amount spent at specific merchant, how recently products were acquired, how recently a merchant was used to make a purchase/transaction, spending/transaction patterns, such as time of date/week/month/year for making purchases/transactions, offers used to make purchases/transactions, and the like. Furthermore, the system may determine offers that the user 202 has accepted but has not yet used. As such, the system may be able to provide the user 202 a modified online shopping experience using offers that the user 202 has previously accepted but not yet used. In some embodiments, these offers may have been selected from an offer source, such as an offer program, newspaper, online list, etc. These offers may have been previously selected, but never used. In some embodiments, the offers may have been partially used. In yet other embodiments, the offers may have been used by the user in the past.

Next, in block 314 the system may maintain, in real-time or close thereto the user merchant profile 314. The user merchant profile includes merchant data and/or financial institution data associated with the user 202. In this way, there is a user 202 centric profile that stores all information relating to the user 202. In this way, the offers for each merchant that the user 202 may be interested in, may be presented to the user 202 when the user 202 is online shopping at that particular merchant.

In this way, all data associated with a user 202 that may be utilized by the modified shopping experience program may be stored in a user 202 centric platform within the user merchant profile 314. In this way, the user merchant profile may constantly keep a user 202 centric platform of information related to offers that a user 202 may be interested in. The user merchant profile keeps user 202 data such that when, as illustrated in block 316, an indication of a user 202 accessing a merchant website is received. Once that indication is received the system utilizes the user merchant profile to present offers to the user 202 that the user 202 may be interested in, based on the user merchant profile. In some embodiments, the offers may be presented as an overlay onto the merchant's website. In some embodiments, the offers may be presented as a widget on the merchant's website. In some embodiments, the offers may be presented in a predefined area of the merchant's website. In yet other embodiment, the merchant's website may be unique to the user 202 based on the offers.

FIG. 4 illustrates a process map of a user 202 initiating the modified shopping experience program process 400, in accordance with one embodiment of the present invention. First, as illustrated in block 402 the user 202 accesses a merchant website. In this way, the user 202 may be utilizing the Internet to search for products. The user 202 may be utilizing a merchant website, interface, online auction, etc. such that the user 202 may be online shopping for products at a merchant. Once it is recognized that a user 202 is accessing an enrolled merchant, the system may determine the identity of the user 202. In this way, the system may determine the IP address, log-in account information, etc. of the individual user 202 that is accessing the merchant account. In yet other embodiments, the system may present an application to the user 202 for the program. In this way, the user 202 may be online shopping through the use of the application. As such, the system may be able to identify the user 202 based on the user 202 accessing the application to perform his/her online shopping.

Once the user 202 is recognized and identified, the system may access the user merchant profile that includes merchant data and/or financial institution data, as illustrated in block 404. The user merchant profile may determine offers for products at the merchant that the user 202 identified as accessing the merchant's website may be interested in.

FIG. 5 illustrates a Venn diagram of the selection of offers for presentment to a user 500, in accordance with one embodiment of the present invention. In the embodiment illustrated in FIG. 5 the system may filters offers within the user merchant profile based on both financial account history 506 and merchant account history 508. In other embodiments, the offers may be filtered based only on financial account history 506. In yet other embodiments, the offers may be filtered based only on merchant account history 508. The circle representing the financial account history 506 illustrates the products that the user 202 may purchase from the merchant based on the user's financials. Financial data comprises data from a financial institution such as user transaction history, user product preferences, and/or the like.

The circle representing the merchant account history 508 illustrates the products that the user 202 may purchase from the merchant based on the merchant's records associated with that user 202. Merchant data may include, but is not limited to, purchase history, online shopping history, offer acceptance history, Internet browsing history, loyalty account information, merchant credit card information, gift card data, and the like. In this way, previously accepted offers and/or previously used offers may be incorporated into the offers available to a user 202. In some embodiments, these offers may have been selected from an offer source, such as an offer program, newspaper, online list, etc. These offers may have been previously selected, but never used. In some embodiments, the offers may have been partially used. In yet other embodiments, the offers may have been used by the user in the past.

The location where the financial account history circle 506 and the merchant account history circle 508 intersects, in this embodiment, illustrates the offers that are presented to the user 502 in the modified online shopping program.

FIG. 6 illustrates a Venn diagram of another embodiment of selection of offers for presentment to a user 600, in accordance with one embodiment of the present invention. In the embodiment illustrated in FIG. 6 the system may again filter offers within the user merchant profile based on both financial account history 506 and merchant account history 508 similar to above in FIG. 5. However, in the embodiment illustrated in FIG. 6, the merchant has promotions 602 that may be specific to that user 202, the user's status as a loyalty account holder, and/or the like. In this way, the circle representing the merchant promotions 602 illustrates the products that the merchant is running promotions for. In this way, the offers presented to the user 202 via the modified online shopping program may be those offers that overlap all three circles, the merchant account history circle 508, the financial account history circle 506, and the merchant promotions circle 602 illustrates the products that the user 202 may purchase from the merchant based on the merchant's records associated with that user 202. In some embodiments, all three circles associated with the merchant account history circle 508, the financial account history circle 506, and the merchant promotions circle 602 must overlap to provide the overlapping offer to the user 202. In some embodiments, only one circle may encompass the offers to provide to the user 202. In other embodiments, one or more circles may encompass the offers to provide to the user 202.

Referring back to FIG. 4, as illustrated in block 406 once the user 202 accessing the merchant website is identified in block 402 and offers that match the user are determined from the user merchant profile in block 404, the system modifies the merchant website. The merchant website is modified to include offers that are determined to be of interest to the user 202. The modified merchant website, whether modified by overlay, widget, positioned offers, completely new website, etc., the user is provided the modified merchant website via the user's system, as illustrated in block 408.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, etc.) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for providing a modified online shopping experience, the system comprising:
    a memory device with computer-readable program code stored thereon;
    a communication device; and
    a processing device operatively coupled to the memory device and the communication device, wherein the processing device is configured to execute the computer-readable program code to:
        receive a merchant opt-in for systematic access to merchant website infrastructure system, wherein the merchant opt-in allows access to merchant data such as merchant customer data associated with a user;
        receive financial institution data associated with the user, wherein the financial institution data is received via accessing a user centric platform comprising transaction history data associated with a financial institution for transactions completed using the financial institution payment account systems, wherein the financial institution data includes transaction history information for the user;
        create a user profile for the user, wherein the user profile includes both merchant data and financial institution data associated with the user, wherein the financial institution data comprises transactional information regarding product purchases made by the user, wherein the merchant data comprises information related to products that the user has purchased from the merchant, and wherein creating the profile comprises comparing the financial institution data with the merchant data to determine an amount of money spent and a number of purchases the user made on a given product type within a period of time;
        determine a probability of the user purchasing at least one or more products available from the merchant based at least in part on the on the amount of money spent and the number of purchases the user made on the given product type within the period of time;
        match the at least one or more products available from the merchant with one or more offers for products available from the merchant based on the probability of the user purchasing the at least one or more available products from the merchant, and wherein the offer for products available from the merchant comprises information relating specifically to an interest of the user determined at least in part from the user profile; and
        provide the user the modified online shopping experience, wherein the modified online shopping is an overlay to the merchant website imputed via the systematic access to merchant website infrastructure system, wherein the overlay includes integrated widgets and includes the one or more offers for products available from the merchant that matches the user's interest, whereby improving an online shopping experience for the user by utilizing financial institution data of the user and merchant data of the merchant to overlay and augment the merchant website for online experience modification for the user.

2. The system of claim 1, wherein the processing device is further configured to execute computer-readable program code to:
    identify the user when the user accesses the merchant via a merchant's webpage; and
    provide the user with the modified online shopping experience based on the identification of the user accessing the merchant's webpage.

3. The system of claim 1, wherein receiving the merchant opt-in further allows for access to and manipulation of the merchant online infrastructure, such that the modified online shopping experience is presented through the merchant online infrastructure.

4. The system of claim 1, wherein providing the user the modified online shopping experience includes presenting the one or more offers for products available from the merchant that match the user's interest in an overlay, wherein the overlay is positioned over the merchant's website such that when the user is viewing the merchant's website the one or more offers are viewable by the user.

5. The system of claim 1, wherein providing the user the modified online shopping experience includes presenting the one or more offers for products available from the merchant that match the user's interest within a predefined section of the merchant's website, such that when the user is viewing the merchant's website the predefined sections of the merchant's website include the one or more offers.

6. The system of claim 1, wherein providing the user the modified online shopping experience includes presenting the one or more offers for products available from the merchant that match the user's interest within a second merchant website, wherein the second merchant website is a unique merchant website that is presented to the user and comprises the one or more offers embedded thereon.

7. The system of claim 1, wherein the further comprises loyalty accounts, transaction history, prior offer acceptance, or transaction frequency, and wherein financial institution data further comprises user accounts, and income.

8. A computer program product for providing a modified online shopping experience, the computer program product comprising at least one non-transitory computer-readable medium having computer-readable program code portions embodied therein, the computer-readable program code portions comprising:

an executable portion configured for receiving a merchant opt-in for systematic access to merchant website infrastructure system, wherein the merchant opt-in allows access to merchant data such as merchant customer data associated with a user;

an executable portion configured for receiving financial institution data associated with the user, wherein the financial institution data is received via accessing a user centric platform comprising transaction history data associated with a financial institution for transactions completed using the financial institution payment account systems, wherein the financial institution data includes transaction history information for the user;

an executable portion configured for creating a user profile for the user, wherein the user profile includes both merchant data and financial institution data associated with the user, wherein the financial institution data comprises transactional information regarding product purchases made by the user, wherein the merchant data comprises information related to products that the user has purchased from the merchant, and wherein the creating the profile comprises comparing the financial institution data with the merchant data to determine an amount of money spent and a number of purchases the user made on a given product type within a period of time;

an executable portion configured for determining a probability of the user purchasing at least one or more products available from the merchant based at least in part on the amount of money spent and the number of purchases the user made on the given product type within the period of time;

an executable portion configured for matching the at least one or more products available from the merchant with one or more offers for products available from the merchant based on the probability of the user purchasing the at least one or more available products from the merchant, and wherein the offer for products available from the merchant comprises information relating specifically to an interest of the user determined at least in part from the user profile; and an executable portion configured for providing the user the modified online shopping experience, wherein the modified online shopping is an overlay to the merchant website imputed via the systematic access to merchant website infrastructure system, wherein the overlay includes integrated widgets and includes the one or more offers for products available from the merchant that matches the user's interest, whereby improving an online shopping experience for the user by utilizing financial institution data of the user and merchant data of the merchant to overlay and augment the merchant website for online experience modification for the user.

9. The computer program product of claim 8 further comprising computer-readable program code portions comprising:

an executable portion configured for identifying the user when the user accesses the merchant via a merchant's webpage; and an executable portion configured for providing the user with the modified online shopping experience based on the identification of the user accessing the merchant's webpage.

10. The computer program product of claim 8, wherein receiving the merchant opt-in further allows for access to and manipulation of the merchant online infrastructure, such that the modified online shopping experience is presented through the merchant online infrastructure.

11. The computer program product of claim 8, wherein providing the user the modified online shopping experience includes presenting the one or more offers for products available from the merchant that match the user's interest in an overlay, wherein the overlay is positioned over the merchant's website such that when the user is viewing the merchant's website the one or more offers are viewable by the user.

12. The computer program product of claim 8, wherein providing the user the modified online shopping experience includes presenting the one or more offers for products available from the merchant that match the user's interest within a predefined section of the merchant's website, such that when the user is viewing the merchant's website the predefined sections of the merchant's website include the one or more offers.

13. The computer program product of claim 8, wherein providing the user the modified online shopping experience includes presenting the one or more offers for products available from the merchant that match the user's interest within a second merchant website, wherein the second merchant website is a unique merchant website that is presented to the user and comprises the one or more offers embedded thereon.

14. The computer program product of claim 8, wherein the merchant further comprises loyalty accounts, transaction history, prior offer acceptance, or transaction frequency, and wherein financial institution data further comprises user accounts, and income.

15. A computer-implemented method for providing a modified online shopping experience, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

receiving, using a computing processing device, a merchant opt-in for systematic access to merchant website infrastructure system, wherein the merchant opt-in allows access to merchant data such as merchant customer data associated with a user;

receiving, using a computing processing device, financial institution data associated with the user, wherein the financial institution data is received via accessing a user centric platform comprising transaction history data associated with a financial institution for transactions completed using the financial institution payment account systems, wherein the financial institution data includes transaction history information for the user;

creating, using a computing processing device, a user profile for the user, wherein the user profile includes both merchant data and financial institution data associated with the user, wherein the financial institution data comprises transactional information regarding product purchases made by the user, wherein the merchant data comprises information related to products that the user has purchased from the merchant, and wherein creating the profile comprises comparing the financial institution data with the merchant data to determine an amount of money spent and a number of purchases the user made on a given product type within a period of time;

determining, using a computing processing device, a probability of the user purchasing at least one or more products available from the merchant based at least in part on the amount of money spent and the number of purchases the user made on the given product type within the period of time;

matching, using a computer processing device, the at least one or more products available from the merchant with one or more offers for products available from the merchant based on the probability of the user purchasing the at least one or more available products from the merchant, and wherein the offer for products available from the merchant comprises information relating specifically to an interest of the user determined at least in part from the user profile; and providing, using a computing processing device, the user the modified online shopping experience, wherein the modified online shopping is an overlay to the merchant website imputed via the systematic access to merchant website infrastructure system, wherein the overlay includes integrated widgets and includes the one or more offers for products available from the merchant that matches the user's interest, whereby improving an online shopping experience for the user by utilizing financial institution data of the user and merchant data of the merchant to overlay and augment the merchant website for online experience modification for the user.

16. The method of claim 15 further comprising:
identify the user when the user accesses the merchant via a merchant's webpage; and
provide the user with the modified online shopping experience based on the identification of the user accessing the merchant's webpage.

17. The method of claim 15, wherein receiving the merchant opt-in further allows for access to and manipulation of the merchant online infrastructure, such that the modified online shopping experience is presented through the merchant online infrastructure.

18. The method of claim 15, wherein providing the user the modified online shopping experience includes presenting the one or more offers for products available from the merchant that match the user's interest in an overlay, wherein the overlay is positioned over the merchant's website such that when the user is viewing the merchant's website the one or more offers are viewable by the user.

19. The method of claim 15, wherein providing the user the modified online shopping experience includes presenting the one or more offers for products available from the merchant that match the user's interest within a predefined section of the merchant's website, such that when the user is viewing the merchant's website the predefined sections of the merchant's website include the one or more offers.

20. The method of claim 15, wherein providing the user the modified online shopping experience includes presenting the one or more offers for products available from the merchant that match the user's interest within a second merchant website, wherein the second merchant website is a unique merchant website that is presented to the user and comprises the one or more offers embedded thereon.

21. The method of claim 15, further comprises loyalty accounts, transaction history, prior offer acceptance, or transaction frequency, and wherein financial institution data further comprises user accounts, and income.

* * * * *